(12) United States Patent
Beck (10) Patent No.: US 10,994,571 B2
(45) Date of Patent: May 4, 2021

(54) WHEEL FOR USE WITH IRRIGATION EQUIPMENT

(71) Applicant: Benjamin Jensen Beck, Burley, ID (US)

(72) Inventor: Benjamin Jensen Beck, Burley, ID (US)

(*) Notice: Subject to any disclaimer, the term of this patent is extended or adjusted under 35 U.S.C. 154(b) by 1 day.

(21) Appl. No.: 15/907,193

(22) Filed: Feb. 27, 2018

(65) Prior Publication Data

US 2018/0249647 A1  Sep. 6, 2018

Related U.S. Application Data

(60) Provisional application No. 62/464,238, filed on Feb. 27, 2017.

(51) Int. Cl.
*B60B 15/02* (2006.01)
*A01G 25/09* (2006.01)

(52) U.S. Cl.
CPC .......... *B60B 15/025* (2013.01); *B60B 15/026* (2013.01); *A01G 25/09* (2013.01); *A01G 25/092* (2013.01)

(58) Field of Classification Search
CPC ....... B60B 15/00; B60B 15/02; B60B 15/023; B60B 15/025; B60B 15/026; B60B 15/08; B60B 15/18
USPC .......................................................... 301/43
See application file for complete search history.

(56) References Cited

U.S. PATENT DOCUMENTS

| | | | | |
|---|---|---|---|---|
| 38,464 A * | 5/1863 | Cameron | ................ | B60B 15/18 305/4 |
| 1,422,377 A * | 7/1922 | Robnett | ................... | B60B 15/02 301/44.3 |
| 1,440,183 A * | 12/1922 | Steele | ..................... | B60B 15/02 301/52 |
| 1,491,667 A * | 4/1924 | Brandt | .................... | B60B 15/02 301/43 |
| 1,507,470 A * | 9/1924 | Crosley | ................... | B60B 15/02 301/40.1 |
| 2,021,265 A * | 11/1935 | Schultz | ................... | B60B 15/02 301/52 |
| 3,690,343 A * | 9/1972 | Crane | .................. | A01G 25/092 239/731 |

(Continued)

FOREIGN PATENT DOCUMENTS

FR  545383 A  * 10/1922  ........... B60B 15/025

OTHER PUBLICATIONS

"Disc.", https://www.merriam-webster.com/dictionary/disc, accessed Feb. 6, 2020, Merriam-Webster, Incorporated, 2020.*

*Primary Examiner* — Kip T Kotter
(74) *Attorney, Agent, or Firm* — Scott D. Swanson; Shaver & Swanson, LLP (57) ABSTRACT

A wheel, typically for use in conjunction with an agricultural irrigation system such as a pivot or wheel line. The wheel has a disc shaped body having a hub to attach to an external frame. The wheel has a plurality of feet attached to the circumference of the body. The feet are generally channel shaped having two ends at either end of the channel. The feet are positioned at the circumference of the body either on the circumference or in indentations or grooves on the circumference such that the ends of the feet overhang the body. Preferably the feet have a space, opening or void between the feet to allow for the passage of snow, mud or other material.

18 Claims, 6 Drawing Sheets

(56) References Cited

U.S. PATENT DOCUMENTS

| | | | | |
|---|---|---|---|---|
| 4,083,378 A | * | 4/1978 | Stearns | A01G 25/092 |
| | | | | 239/731 |
| 5,451,001 A | * | 9/1995 | Kumm | A01G 25/09 |
| | | | | 239/726 |
| 9,445,555 B2 | | 9/2016 | Cook | |
| 9,481,204 B1 | * | 11/2016 | Wiebe | A01G 25/09 |
| 10,272,717 B1 | * | 4/2019 | Erdman | B60C 7/06 |
| 2012/0241531 A1 | * | 9/2012 | Werner | B60C 11/0311 |
| | | | | 239/1 |

* cited by examiner

WHEEL FOR USE WITH IRRIGATION EQUIPMENT

PRIORITY/CROSS-REFERENCE TO RELATED APPLICATIONS

This application claims the benefit of U.S. Provisional Application No. 62/464,238, filed Feb. 27, 2017, the disclosure of which is incorporated by reference.

TECHNICAL FIELD

The presently disclosed technology relates to a wheel for use in an irrigation system. More particularly, the present invention is an improved wheel for use in conjunction with an agricultural field irrigation system.

BACKGROUND

Pivot irrigation, used in large scale agricultural farming, employs a series of sprinklers mounted to an irrigation line which is connected to a center point in a field. While the sprinklers are operating, the line sweeps around the field while remaining anchored to the center point, similar to the radius of a circle. Thus, this irrigation pattern often results in the popular crop circles visible from while flying above agricultural land. Though similar irrigation devices may not be anchored to a center point and instead be configured to travel along a field in a straight line, sometimes called linear move irrigation, pivot irrigation is significantly more common.

Whether an irrigation line is configured for linear or pivot operation, the above ground irrigation line is supported by frames to which are attached wheels, referred to herein a wheels, which roll along the ground as the irrigation line sweeps across or around the field. Common wheels and rubber tires, such as might be used on large vehicles or equipment, have been used as wheels. They are problematic, however, because they may deflate, are susceptible to losing traction in the mud or snow, and/or cause significant crop damage, among other things.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a wheel constructed of one or more rigid materials, such as metal, wood, or heavy duty plastic, such that it need not be inflated. The wheel's main body is shaped as a circular disc, the circumference of which supports a plurality of feet. The body may be of varying thickness, sizes and configurations. Both sides of the body may be planar, the body may have one planar and one non-planar side, or both sides maybe non-planar. The body may have projections or supports attached to it. At the center of the body is located a hub configured to facilitate the attachment of the wheel to an irrigation system, specifically to the frame supporting an irrigation line.

The plurality of feet may be of differing or identical lengths, with each of said feet having a first longitudinal end and a second longitudinal end. In a preferred embodiment the feet are fourteen inches in length having a channel width of 5". In a preferred embodiment each foot has a U-shaped profile with the bottom of the "U" suggesting a base and the sides of the "U" constituting flanges, although similar channel shapes such as a "V" shaped channel can be utilized. Each foot is attached to the body such that it is generally perpendicular to the body and horizontal to the ground upon which the wheel will be operating, and is oriented such that the base of the U-shaped profile is directed radially inward, while the flanges of the U-shaped profile are directed radially outward.

Each foot is anchored to the body at a point of attachment located between the first longitudinal end and the second longitudinal end of each foot, with the first longitudinal end of each foot directed toward the frame and extending beyond the second side of said body. At the point of attachment, the base of the channel may be anchored directly to the circumference of the body. Alternatively, the circumference of the body may contain a plurality of recesses or grooves into which the base of each foot may be inserted and attached. Whether attached on the circumference or within a recess in the circumference, the flanges of the channel of each foot extend radially outward and are of sufficient length such that they reach beyond the circumference of the disc. This allows for the end of the flanges to contact the ground when the wheel is in use.

Though each foot is attached to the body between the foot's first longitudinal end and second longitudinal end, the points of attachment may vary from foot to foot to provide a staggered appearance. The second longitudinal end of each of each of the feet may be connected to form a ring for additional support. In certain configurations, each of said second longitudinal ends defines a plane and the feet are interconnected at the second longitudinal end of each foot via a singular support, such as a loop or ring.

In a preferred embodiment each foot is positioned along the circumference of the body such that there is an opening, or gap, between otherwise adjacent feet. Though the size of the gap may vary, in a preferred embodiment the gap is sufficiently large such that it allows for the passage of mud, snow, or other debris while the wheel is in motion.

The hub is configured to facilitate the connection of the wheel to an irrigation frame supporting an irrigation line. In certain configurations, the wheel may be secured by using anchors, such as bolts, passing through holes in the body and into recesses contained in the frame. The wheel may also contain one or more braces extending from the hub to the circumference, where it may be attached to a foot for additional support. In a preferred embodiment five braces extend 18 inches from the hub to five different feet positioned around the wheel to provide radial support to the wheel.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

DETAILED DESCRIPTION OF THE PREFERRED EMBODIMENTS

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

Figure 1:
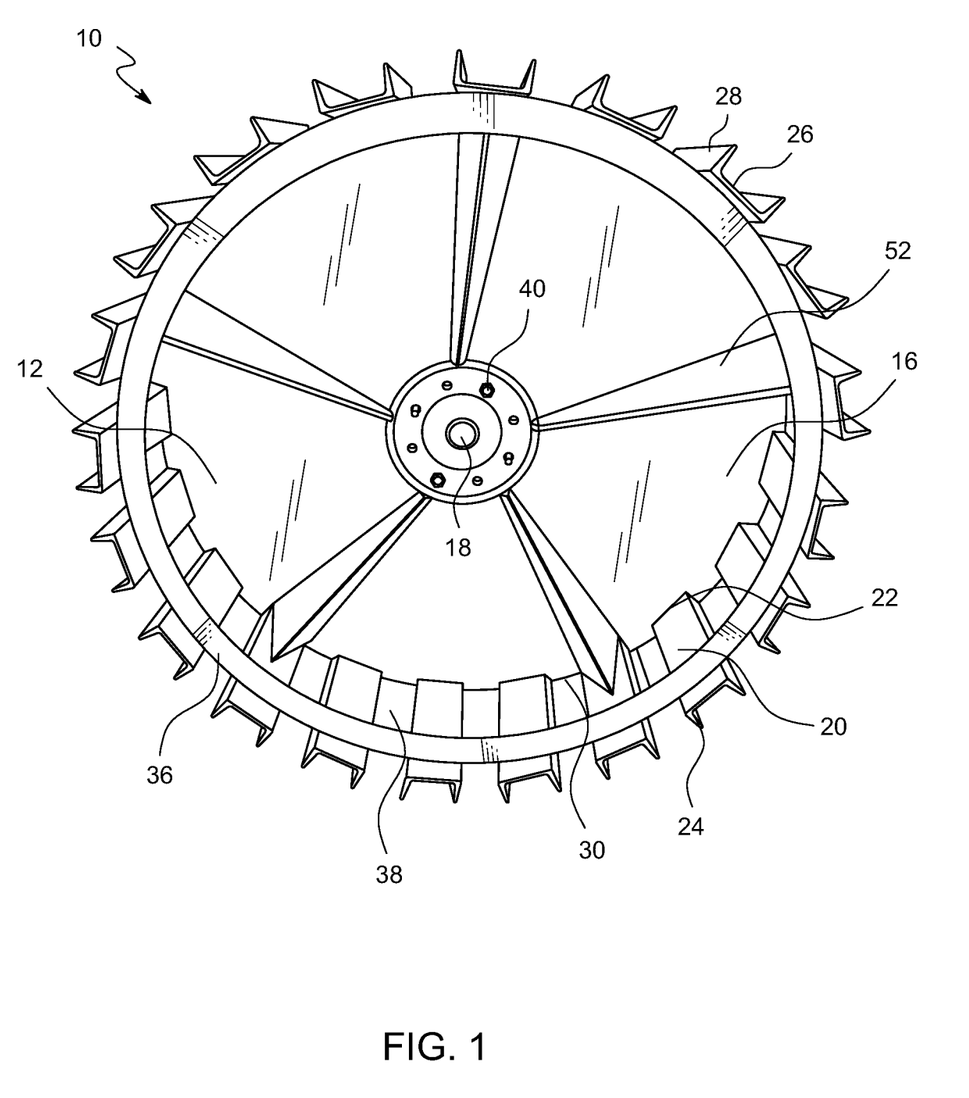
FIG. 1 is a perspective view from the ring side of the irrigation wheel.

FIG. 1 is a perspective view of an embodiment of the wheel 10 for supporting an irrigation frame and line (not shown). In the depicted embodiment, the wheel 10 includes a body 12 defined as a generally planar disc having a second side 14 (not shown) and an opposing first side 16. Though the body may be made of a variety of materials and be of various thicknesses, in a preferred embodiment the body is made of ⅜" steel, though ¼" and 3/16" may also be employed, among other thicknesses. The wheel 10 includes a hub 18 and defines a circumference 30. In the preferred embodiment, the feet overlap the body and ring 26 2.5". This construction is thought to provide maximum compatibility with a variety of common frame gear box and axle shaft configurations, though hub 18 variations may be employed to accommodate different gearbox and axle arrangements without deviating from the scope of invention disclosed herein.

FIG. 1 illustrates a plurality of channel shaped feet attached to the disc body 12. Each foot 20 has a first longitudinal end 22 and a second longitudinal end 24. When viewed from the first longitudinal end 22 to the second longitudinal end 24, each foot has a U-shaped profile, with a base 26 and flanges 28. In the preferred embodiment, the base of each foot 20 is 5" wide, though other widths and flange heights may be employed. While each foot may be independently fabricated, the feet may alternatively be cut from a source channel, such as ⅘ channel steel, for efficiency and to provide uniformity. Each foot 20 is attached to the body 12 at an attachment point located between the first longitudinal end 22 and the second longitudinal end 24 of the foot 20 such that the flanges 28 of the U-shaped profile extend radially away from the hub 18. The flanges 28 of each foot 20 extend beyond the circumference 30 to enable the flanges 28 to engage with the ground during operation. FIG. 1 also depicts the gaps 38 between otherwise adjacent feet 20. These gaps 38 allow snow, mud, or other debris to pass through the wheel 10 and minimize loss of traction.

FIG. 1 also depicts the anchors 40, shown as eight bolts, inserted at the hub 18 of the wheel 10 and used to attach the wheel 10 to the frame (not shown) while allowing the wheel 10 to rotate. Also shown are five braces 52 radiating from the hub 18 of the first side 16 of the body 12 and each attached to a foot 20 for additional support.

Figure 2:
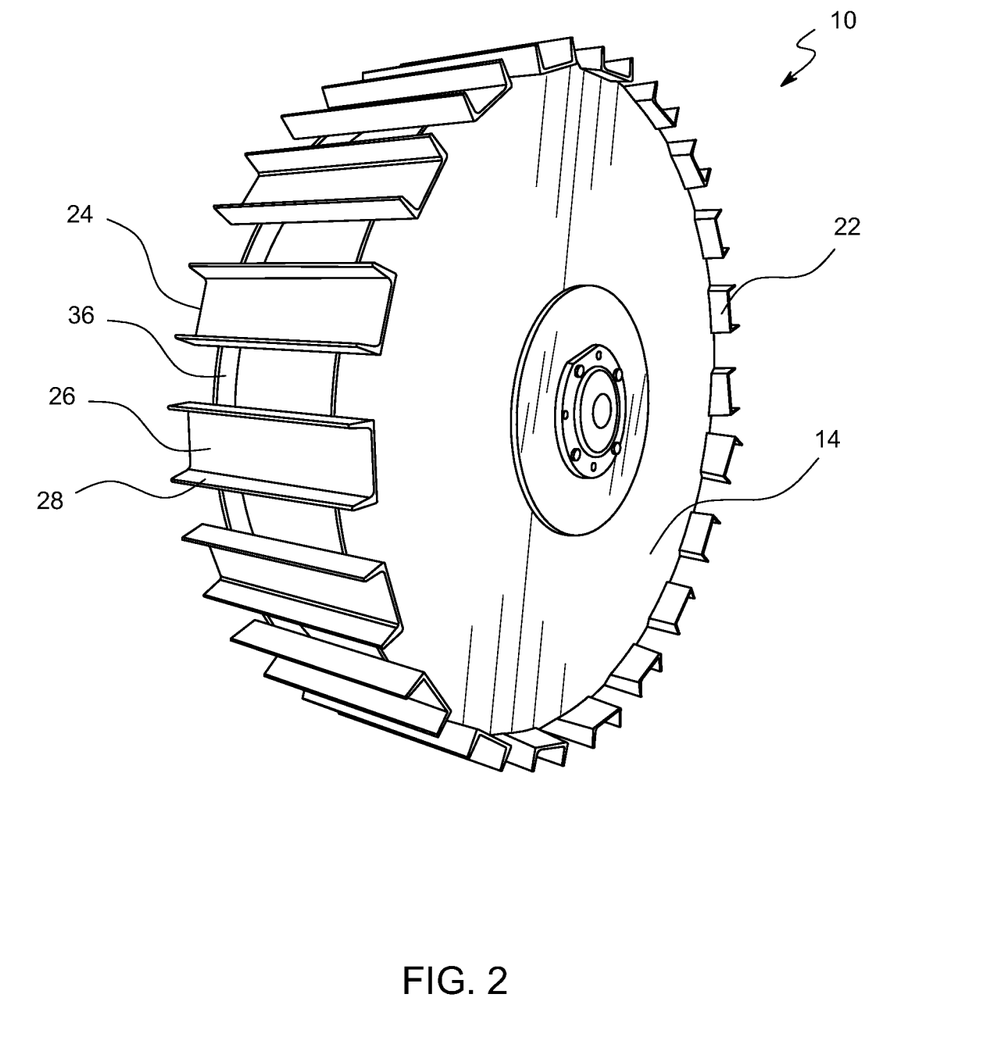
FIG. 2 is a perspective view of the irrigation wheel.

FIG. 2 is a perspective view of the irrigation wheel 10 attached as seen from the second side 14 of the wheel 10. FIG. 2 also demonstrates that the first longitudinal end 22 of each foot 26 extends beyond the second side 14 of the body. FIG. 2 illustrates an embodiment in which the second longitudinal end 24 of each foot 26 extends beyond the ring support 36 connecting each foot. Flanges 28 are wider at the base than at the distal end from the base of the flange.

Figure 3:
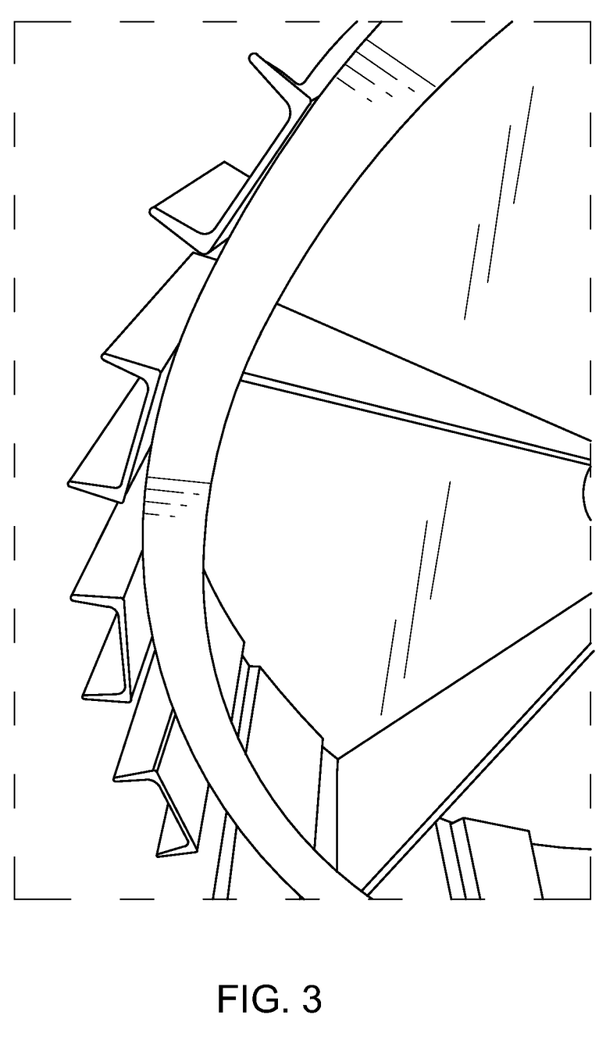
FIG. 3 is a side perspective view of the feet of the irrigation wheel showing the extension of the feet beyond the plane of the ring.

FIG. 3 illustrates the extension of the second longitudinal end of the foot beyond the ring support. In a preferred embodiment, the first longitudinal end 22 of a foot 20 extends beyond the second side 14 by 2.5", though other extension lengths may be used or alternatively the ring may be attached to the second longitudinal end. Also shown is the radial extension of the flanges 28 to enable the wheel 10 to engage with the ground.

Figure 4:
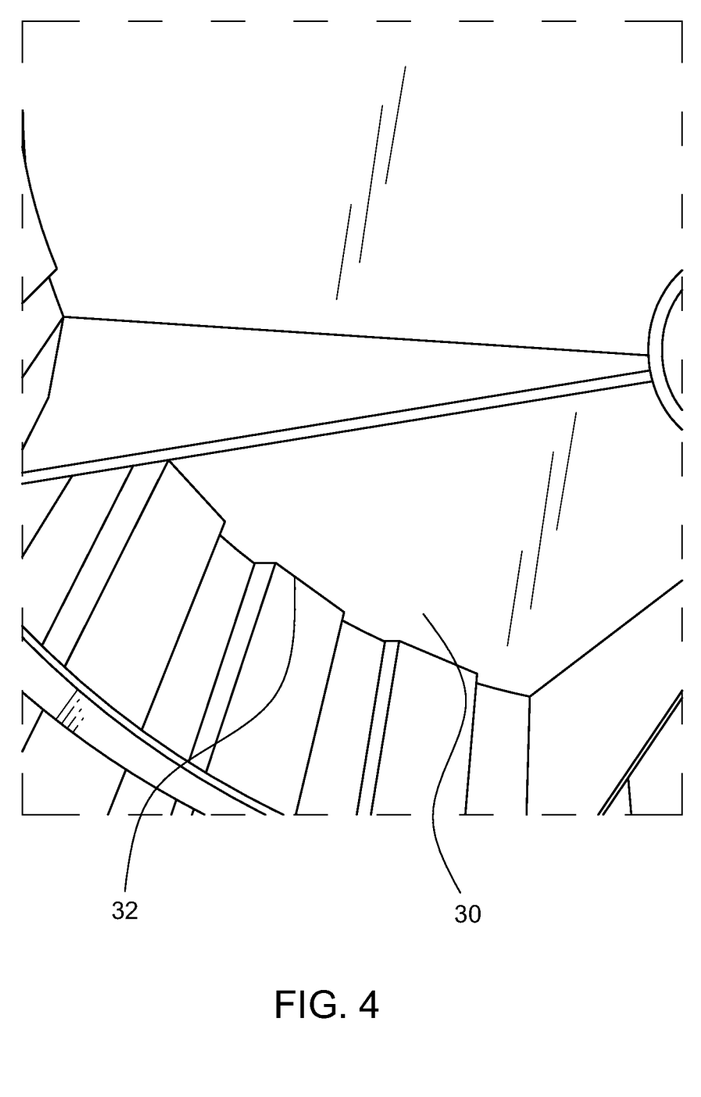
FIG. 4 is a perspective view of the inner aspects of the irrigation wheel.

FIG. 4 is a closer perspective view of some of the first longitudinal end 22 of a foot 20 from the first side 16 of the irrigation wheel 10. This view more closely depicts the recess 32 in the circumference 30 into which each foot is inserted and attached. As shown the shape of the recess matches the shape of the U-shaped foot.

FIG. 4 is an alternative perspective view from the first side 16 of the irrigation wheel 10. In the embodiment shown, the circumference 30 contains a plurality of recesses 32 and each foot 20 is attached to the body at the circumference 30 via the recesses 32. This view more closely shows the attachment of the second longitudinal end 24 of each foot 20 to the circular support loop 36. Also depicted are the anchors 40 at the hub 18 of the wheel 10, and the braces 52 attached to the first side 16 of the body 12, with each brace 52 spanning from the hub 18 of the body 12 to a foot 20.

Figure 5:
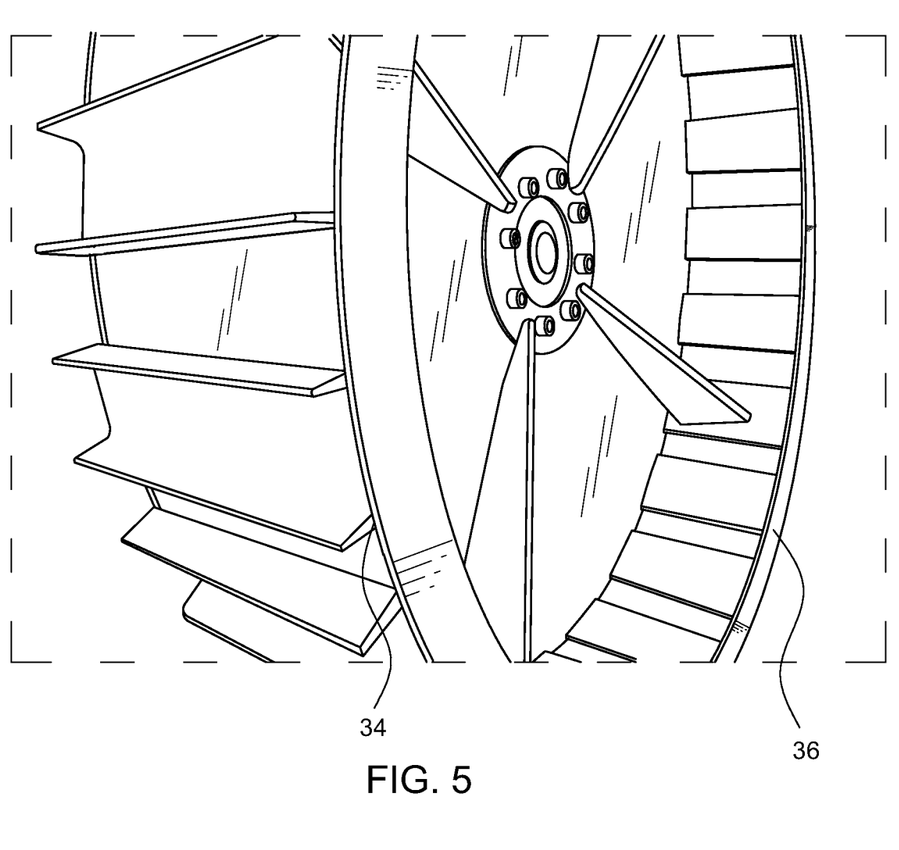
FIG. 5 is an alternative embodiment of the irrigation wheel in which the ring is aligned with an edge of the treads of the wheel.

FIG. 5 is a perspective view of an embodiment of the invention illustrating the ring support 36 aligned with the second longitudinal end of the foot 34. The ring can be constructed of a single component or of multiple components.

Figure 6:
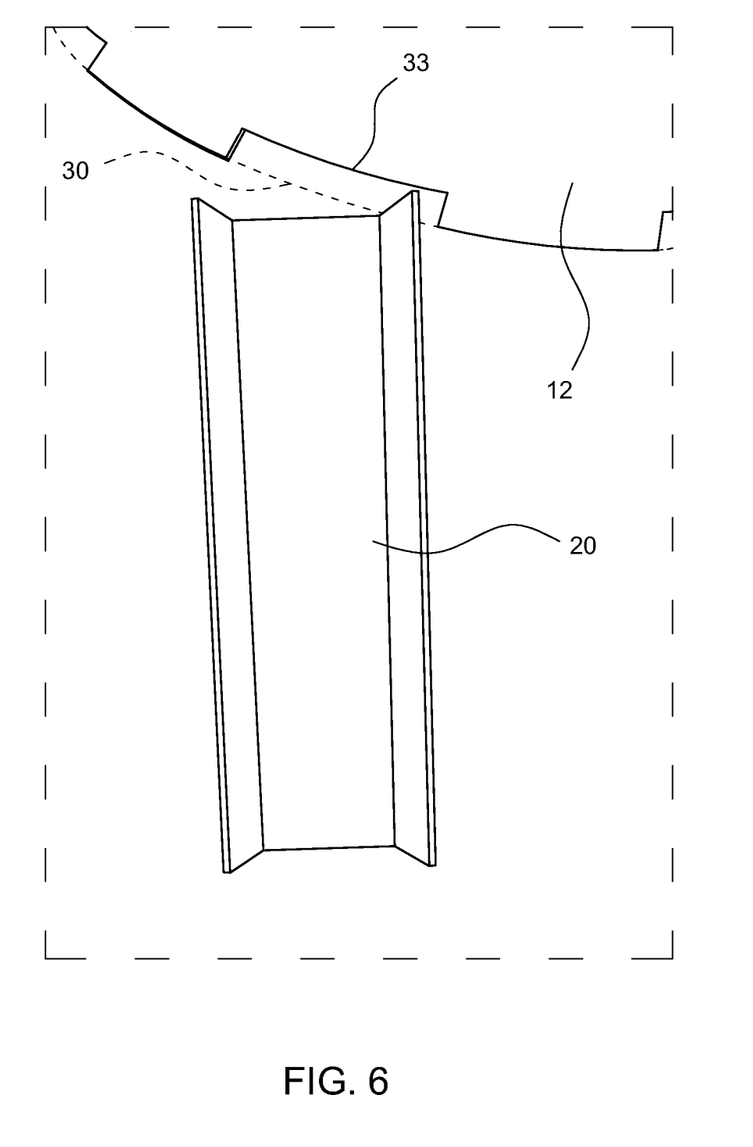
FIG. 6 is a view of the circumference of the wheel with feet removed and an independent foot for comparison.

FIG. 6 is a cutaway view of the disc body 12 having foot 20 shown detached and alongside the body. The foot 20 is positioned and connected within the groove 33 to construct the operational wheel. In a preferred embodiment the shape of indentation or recess 33 of each foot matches the shape of the channel 20, whether that be in a "U" shape as shown or in an alternative shape such as a "V". In other words, each recess is in the shape of the channel that is mounted in the recess.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

I claim:

1. A wheel for rotatable attachment to irrigation equipment consisting essentially of:

a single circular disc-shaped solid body having a first side and a second side, a center defining a hub, wherein said body defines a circumference;

a plurality of elongate channel shaped feet attached to said body, each of said feet defining a channel having a first longitudinal end and a second longitudinal end defined by the ends of said channel, wherein said elongate channel shaped feet comprise a U-shaped profile having two flanges connected by a base in said U-shape and defining a channel between said first longitudinal end and said second longitudinal end;

one or more braces spanning from said hub to one or more of said feet; and wherein said feet are attached to said body at said circumference of said body at a point on said feet between said first longitudinal end and said second longitudinal end such that said first longitudinal end and said second longitudinal end overhang said body.

2. The wheel of claim 1, wherein each of said feet is positioned such that a space remains between otherwise adjacent feet.

3. The wheel of claim 1, wherein said feet are attached to said body such that said channel is orientated in a plane perpendicular to a plane defined by said body.

4. The wheel of claim 1 wherein said second longitudinal ends of adjacent feet are connected by a ring.

5. The wheel of claim 4 said second longitudinal ends of said channels define a plane and are coplanar, wherein said second longitudinal ends are attached to a ring at the second longitudinal end of each of said elongate channel shaped feet, wherein said ring defines a plane parallel to a plane defined by said body.

6. The wheel of claim 1, wherein said feet are interconnected by a ring at a point between the connection with said body and said second longitudinal end.

7. The wheel of claim 1 wherein said second side and said first side are parallel and planar and each of said plurality of feet is attached to said body normal to said second side and said first side of said body.

8. The wheel of claim 1 wherein said first longitudinal end overhangs said body approximately 2.5 inches.

9. A wheel for rotatable attachment to an irrigation equipment frame, said wheel consisting essentially of:

a single solid disc-shaped body having a second side and a first side, a center defining a hub, and a circumference defined by the perimeter of said body;

a plurality of elongated feet attached to said body normal to a plane defined by said body, each of said feet having a first longitudinal end, a second longitudinal end, and a generally channel shaped profile comprising a base having flanges defining sides of said channel;

wherein said circumference of said body containing one or more recesses, wherein one or more of said feet attached to said body by insertion into said recesses such that said flanges of said channels extend radially outward beyond said circumference of said body, wherein said recesses are in the shape of said channels;

wherein each of said feet is positioned such that said first longitudinal end and said second longitudinal end each overhang said body;

wherein each of said feet further positioned such that a space remains between otherwise adjacent feet; and said hub configured to facilitate attachment of said wheel to an irrigation equipment frame such that said wheel is able to rotate freely.

10. The wheel of claim 9, wherein said wheel comprises at least one brace attached to said body and extending from said hub to one of said plurality of elongated feet.

11. The wheel of claim 9, wherein said channel comprises a U-shaped profile having two flanges connected by a base in said U-shape.

12. The wheel of claim 11, wherein said recesses in said circumference of said body comprise a U-shape.

13. The wheel of claim 9, wherein said flanges are tapered so as to be wider at said base than at an end of said flange extending outward from said base.

14. The wheel of claim 9, wherein said plurality of feet further configured such that said second longitudinal ends define a plane and said second longitudinal ends are attached to a ring connecting adjacent second longitudinal ends of adjacent feet.

15. The wheel of claim 9, wherein said feet are connected by a ring proximate to said second end of said feet.

16. The wheel of claim 15, wherein said second end of at least one of said feet overhangs said ring by approximately 2.5 inches.

17. A wheel for rotatable attachment to irrigation equipment consisting essentially of:

a single circular disc-shaped solid body having a first side and a second side, a center defining a hub, wherein said body defines a circumference;

a plurality of elongate channel shaped feet attached to said body, each of said feet defining a channel having a first longitudinal end and a second longitudinal end defined by the ends of said channel, wherein said elongate channel shaped feet comprise a U-shaped profile having two flanges connected by a base in said U-shape and defining a channel between said first longitudinal end and said second longitudinal end;

wherein said circumference of said body comprises a plurality of recesses, wherein each of said plurality of channel shaped feet is attached within a respective recess of said plurality of recesses; and wherein said feet are attached to said body at said circumference of said body at a point on said feet between said first longitudinal end and said second longitudinal end such that said first longitudinal end and said second longitudinal end overhang said body.

18. The wheel of claim 17, wherein said each of said plurality of recesses is channel shaped.

* * * * *